Patented May 26, 1953

2,639,782

UNITED STATES PATENT OFFICE 2,639,782

SEPARATION OF HYDROCARBONS

Orville L. Polly and Clyde H. O. Berg, Long Beach, Calif., assignors to Union Oil Company of California, Los Angeles, Calif., a corporation of California No Drawing. Application July 30, 1948, Serial No. 41,731

9 Claims. (Cl. 183—115)

This invention relates to the separation of hydrocarbons, and in particular concerns an improved solvent extraction process for the separation of gaseous hydrocarbon mixtures.

In the commercial production of hydrocarbons by cracking or other operations the desired hydrocarbon products are almost invariably obtained in admixture with substantial quantities of other closely related hydrocarbons. Separation of such mixtures by ordinary distillation methods can seldom be accomplished satisfactorily since the various components of the mixtures usually have boiling points lying very closely together. Thus, for example, it is difficult to separate butadiene from mixtures thereof with other hydrocarbons having four carbon atoms, i. e., butanes and butenes, since there is only about 10° C. difference between the boiling points of the lowest-boiling and highest-boiling of these materials. Of the several known general methods for separating materials having almost equal boiling points, that of selective extraction by means of a liquid solvent is fundamentally practical by reason of its economy and ease of operation. The efficiency of any solvent extraction process, however, depends on the selectivity of the solvent employed.

It is an object of the present invention to provide an improved solvent extraction process for the separation of gaseous mixtures of hydrocarbons.

Another object is to provide a hydrocarbon separation process in which is employed novel selective solvents having a high degree of selectivity.

A further object is to provide an improved method for separating mixtures of hydrocarbons having four carbon atoms.

Other objects will be apparent from the following detailed description of the invention and various advantages not specifically referred to herein will occur to those skilled in the art upon employment of the invention in practice.

We have now found that the above objects and attendant advantages may be realized in a process whereby gaseous hydrocarbon mixtures are subjected to selective solvent extraction with a mixed solvent comprising formamide. More particularly, we have found that liquid mixtures comprising formamide and ring-saturated heterocyclic compounds containing two hetero atoms selected from the class consisting of oxygen, sulfur, and nitrogen have a high degree of solvent selectivity for hydrocarbons, and that mixed hydrocarbons may accordingly be separated advantageously by extracting them with a mixed solvent of such type.

The solvent extraction process of the present invention is particularly applicable to the separation of feed stocks consisting of mixtures of hydrocarbons having the same number of carbon atoms but having different degrees of unsaturation, for example, mixtures of members of a horizontal group in the following table:

| No. of Carbon Atoms | Degree of Unsaturation | | |
|---|---|---|---|
| | None (Paraffins) | One (Monoolefins) | Two (Diolefines and Acetylenes) |
| 2 | Ethane | Ethylene | Acetylene. |
| 3 | Propane | Propylene | Methyl-acetylene. |
| 4 | Butanes | Butenes | Butadiene and Butynes. |
| 5 | Pentanes | Pentenes, Methyl-butenes | Pentadiene. Isoprene. Dimethyl-acetylene, etc. |

However, the above definition should not be regarded as limiting the invention to these specific separations, for it is possible to separate by the process of the invention hydrocarbons of the same degree of unsaturation, such as 1-butene from 2-butene, for example, in which pair the 2-butene behaves as though it were more saturated than the 1-butene. Materials of three degrees of unsaturation, such as vinyl acetylene, for example, and cyclic hydrocarbons such as cyclopropane, or cyclobutane, etc. may also be separated from other hydrocarbons of similar boiling point.

The process of the invention is conveniently carried out in an extraction column of conventional design. If desired, the column may be packed with materials to provide improved gas-liquid contact, e. g., Raschig rings, helices, plates, etc. According to a preferred mode of operation, the gaseous feed comprising mixed hydrocarbons is introduced into the column at a point near the middle of its length, while the selective solvent is introduced near the top. The "raffinate" gas, which contains a larger proportion of the less unsaturated constituents than the feed stock, rises through the upper part of the column countercurrent to the flow of liquid solvent and leaves the column at the top, while the "extract" gas, which contains a larger proportion of the more unsaturated constituents than the feed stock, is absorbed by the solvent and carried down to the bottom of the column where it is discharged. The solvent containing the extract gas taken from the bottom of the column is introduced into a distillation column, which may be equipped with a reboiler and reflux cooler, and by the usual process of fractional distillation the extract gas is separated from the solvent and leaves the column at the top. Part of the extract gas is returned to the base of the extraction column to be subjected to further extraction with the solvent, and the remainder passes to storage. The bottoms from the distillation column are passed through a cooler, purified if necessary, and recirculated to the extraction column.

In a modification of the above process, the return to the extraction column of a portion of the extract gas is accomplished within the extraction column itself by the addition of heat at the base of the column so as to boil off a portion of the extract gas from the solvent. Although these processes are preferred, other modifications of the solvent extraction process in which the selective solvents of the invention are employed are those of the "extractive distillation" type such as is described in U. S. Patent No. 1,948,777, or of other conventional types used in liquid extraction of gaseous mixtures.

The following example will illustrate the practice of the invention according to a preferred mode of operation, but is not to be construed as limiting the same.

Example I

A mixture containing approximately equal parts by weight of butadiene and normal butane is fed at a rate of about 1.8 pounds per hour into the middle of a packed column about forty feet high and three inches in diameter. A solvent consisting of about 80 per cent by weight of dioxane and about 20 per cent by weight of formamide is fed into the top of the column at a rate of about 80 pounds per hour. A pressure of about 20 pounds gage is maintained within the column, and the temperature at the bottom of the column is maintained at about 180° F. by means of a heater. The remainder of the column operates at a temperature of about 100° F. The solvent withdrawn from the bottom of the extraction column is passed to a distillation column where the extract gas is separated from the solvent, the latter being recycled to the top of the extraction column. Approximately equal volumes of raffinate and extract gases are obtained per hour from the tops of the extraction column and distillation column, respectively. The extract gas analyzes upwards of 90 per cent by weight of butadiene. The same process and solvent may be applied to the separation of mixtures of butenes and butadiene, butanes and butenes, and other hydrocarbon mixtures as indicated previously.

The mixture of dioxane and formamide used in the process just described is a preferred solvent for use according to the invention. However, as previously mentioned, any ring-saturated heterocyclic organic compound containing two oxygen, nitrogen or sulfur hetero atoms may be employed instead of the dioxane. All of such compounds display some solvent selectivity for hydrocarbons, but not to a degree of technical importance. However, when admixed with formamide as herein disclosed their selectivity is greatly enhanced. Thus, for example, at a temperature of about 80° F. pure dioxane dissolves only about 1.3 times as much butadiene as butane. A mixture of about 80 per cent by weight of dioxane and 20 per cent by weight of formamide, however, will dissolve more than three times as much butadiene as butane at 80° F. Thus the addition of formamide to dioxane substantially trebles the solvent selectivity of dioxane for butadiene with respect to butane. Similar increases in solvent selectivity may be effected by the use of formamide in admixture with the other solvents of the present class.

The heterocyclic compounds which are employed in admixture with formamide in separating mixtures of gaseous hydrocarbons according to the invention are preferably liquids under normal conditions of temperature and pressure, although low-melting solids which are liquids under the conditions of the extraction process may also be employed. A preferred class of heterocyclic compounds is formed of the normally liquid ring-saturated heterocyclic compounds having two oxygen, sulfur or nitrogen hetero atoms. Such compounds may be represented by the formulas:

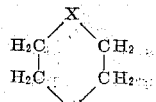

and

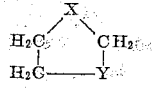

wherein X and Y each represents an oxygen or sulfur atom, or an NZ group, Z being hydrogen or a hydrocarbon radical containing not over six carbon atoms; and one or more —OH, —SH, —NH$_2$, —O—, —S—, —NH—, or =N— groups; and one of the hydrogen atoms may be replaced by a methyl group. X and Y may also be in the 1-3 instead of the 1-4 position in the 6-membered ring. It will be noted that all of such compounds are ring-saturated, i. e., there are no double bonds in the ring. Examples of such compounds are dioxane, methyl dioxane, dioxolane, methyl dioxolane, thioxane, methyl thioxane, morpholine, N-morpholine ethanol, methyl morpholine, N-morpholine ethanol ethyl ether, N-isopropyl morpholine, N-amyinomethyl morpholine, methyl morpholine, etc.

The proportion of formamide employed in admixture with such heterocyclic solvents may be varied between relatively wide limits depending upon the nature of the heterocyclic solvent, the nature of the hydrocarbon mixture to be extracted, and the conditions under which the extraction is carried out. In any case, however, it will be an amount sufficient to effect a substantial increase in the solvent power of the heterocyclic solvent for one of the components of the hydrocarbon mixture subjected to the extraction process. Such amount usually represents between about 5 and about 35 per cent by weight of the entire mixed solvent.

The following examples are further illustrative of the practise of the invention.

Example II

A mixture of approximately equal parts by weight of normal butane and butene-2 is passed at a rate of about 2.5 pounds per hour upwardly through a packed column countercurrent to a descending stream of a solvent consisting of about 90 per cent by weight of morpholine and 10 per cent by weight of formamide. The solvent is supplied to the top of the column at a rate of about 100 pounds per hour. The column is operated under a pressure of about 15 pounds gage and a temperature of about 90° C. The solvent solution of extract gas is fractionally distilled to recover an extract gas containing better than 80 per cent by weight of butene-2.

*Example III*

A mixture consisting of about 65 per cent by weight of ethylene and about 35 per cent by weight of ethane is extracted with a solvent consisting of about 70 per cent by weight of pyridine and about 30 per cent by weight of formamide as in Example II. The extract gas analyzes better than 85 per cent by weight of ethylene.

In general, any hydrocarbon gases showing appreciable differences in solubility in the solvents of the present class may be separated by the process of the invention, the ease and completion of the separation increasing with increasing differences in solubility with the more soluble gas being concentrated in the extract phase. The process is especially well adapted to use in separating hydrocarbons of different degrees of unsaturation, particularly the hydrocarbons containing four carbon atoms.

Many modifications may be applied to the processes described above. For example, the extraction equipment may be fitted with heaters or coolers to provide for extraction at any temperature between the approximate condensation point of the gaseous feed stock and the boiling point of the selective solvent, under the conditions of use. Pressure may vary correspondingly. Flow rates may be varied over wide limits. A temperature gradient may be maintained along the extraction column if desired, in which case the temperature should increase in the direction of flow of the extract gas. Absorbers may be provided to purify the raffinate and extract gases of residual traces of solvent. In case the composition of the selective solvent is altered in the process of removing the extract gas from it, it may be adjusted by purification or by addition of a required component. The distillation of the extract phase may be conducted in the presence of steam, pressure or vacuum. In general, any of the techniques applied to the process of selective solvent extraction may be applied to the present process.

Other modes of applying the principle of our invention may be employed instead of those explained, change being made as regards the methods or materials herein disclosed, provided the step or steps stated by any of the appended claims, or the equivalent of any such step or steps, be employed.

This application is a continuation-in-part of our copending application, Serial No. 449,194, filed June 30, 1942, now abandoned.

We, therefore, particularly point out and distinctly claim as our invention:

1. A process for the separation of a normally gaseous hydrocarbon mixture which comprises contacting said mixture with a selective solvent comprising a major proportion of a liquid ring-saturated heterocyclic compound containing two hetero atoms selected from the class consisting of oxygen, sulfur and nitrogen atoms and a minor proportion of formamide, thereby dissolving one component of said hydrocarbon mixture without dissolving another component thereof.

2. A process for the separation of a normally gaseous hydrocarbon mixture with a selective solvent comprising from about 65 to about 95 per cent by weight of a liquid ring-saturated heterocyclic compound containing two hetero atoms selected from the class consisting of oxygen, sulfur and nitrogen atoms and from about 35 to about 5 per cent by weight of formamide, thereby dissolving one component of said hydrocarbon mixture without dissolving another component thereof.

3. The process of claim 1 in which the hydrocarbon mixture comprises hydrocarbons having four carbon atoms.

4. The process of claim 1 in which the heterocyclic compound is dioxane.

5. The process of claim 4 in which the hydrocarbon mixture comprises hydrocarbons having four carbon atoms.

6. A process for the separation of a mixture of butadiene and butene which comprises contacting said mixture with a selective solvent comprising from about 65 to about 95 per cent by weight of a liquid ring-saturated heterocyclic compound containing two hetero atoms selected from the class consisting of oxygen, sulfur and nitrogen atoms and from about 35 to about 5 per cent by weight of formamide, thereby selectively dissolving the butadiene in said solvent, and thereafter separating the butadiene from said solvent.

7. A process for the separation of a normally gaseous hydrocarbon mixture which comprises continuously subjecting said mixture to countercurrent solvent extraction with a selective solvent comprising from about 65 to about 95 per cent by weight of a liquid ring-saturated heterocyclic compound containing two hetero atoms selected from the class consisting of oxygen, sulfur and nitrogen atoms and from about 35 to about 5 per cent by weight of formamide, continuously separating from the extract the component of said hydrocarbon mixture which is selectively dissolved by said solvent, and thereafter returning substantially hydrocarbon-free selective solvent to the extraction.

8. The process of claim 7 in which the heterocyclic compound is dioxane.

9. The process of claim 7 in which the hydrocarbon mixture comprises hydrocarbons containing four carbon atoms.

ORVILLE L. POLLY.
CLYDE H. O. BERG.

References Cited in the file of this patent

UNITED STATES PATENTS

| Number | Name | Date |
|---|---|---|
| 2,063,680 | Isham | Dec. 8, 1936 |
| 2,128,958 | Mueller-Cunradi et al. | Sept. 6, 1938 |
| 2,366,360 | Semon | Jan. 2, 1945 |
| 2,366,361 | Semon et al. | Jan. 2, 1945 |
| 2,374,984 | Evans et al. | May 1, 1945 |
| 2,383,547 | Hamill et al. | Aug. 28, 1945 |